UNITED STATES PATENT OFFICE.

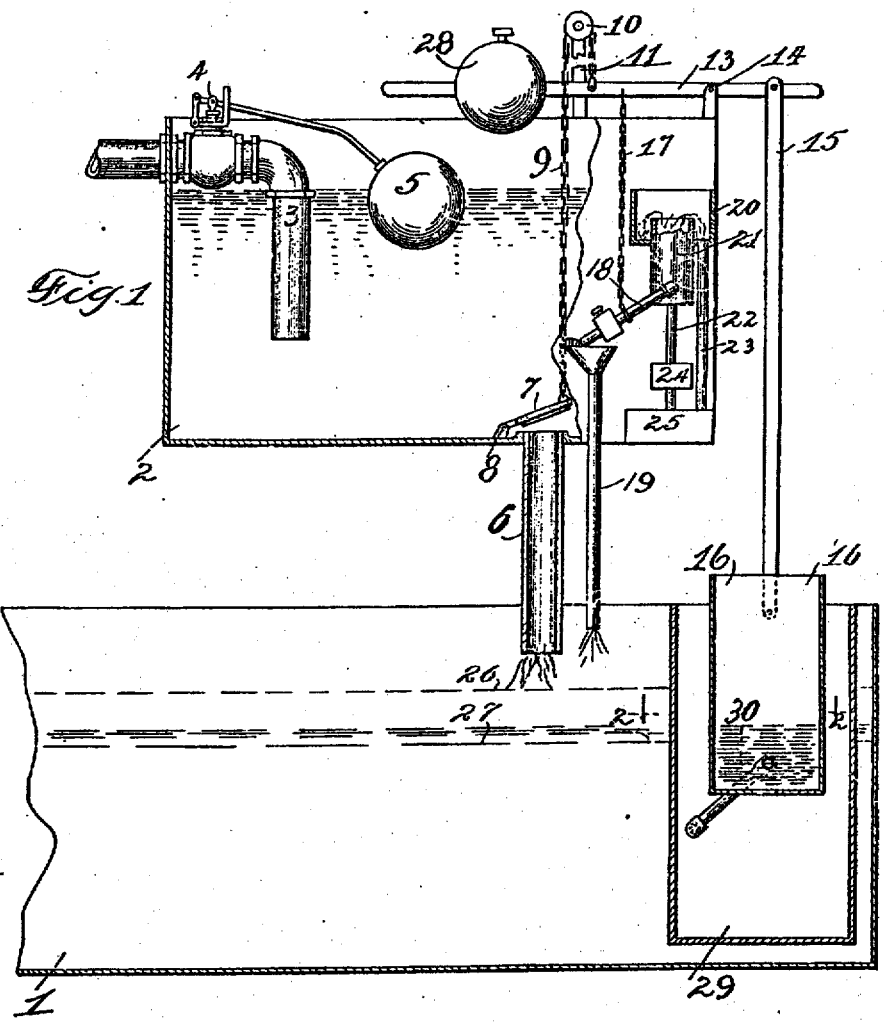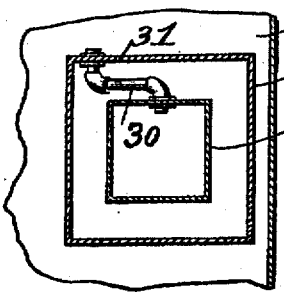

KENT W. BARTLETT, OF MADISON, WISCONSIN, ASSIGNOR TO NORTHERN WATER SOFTENER COMPANY, A CORPORATION OF MAINE.

WATER-SOFTENING APPARATUS.

1,007,176.  Specification of Letters Patent.  Patented Oct. 31, 1911.

Application filed January 22, 1908. Serial No. 412,112.

*To all whom it may concern:*

Be it known that I, KENT W. BARTLETT, citizen of the United States, residing at Madison, in the county of Dane and State of Wisconsin, have invented a certain new and useful Improvement in Water-Softening Apparatus, of which the following is a full, clear, concise, and exact description, reference being had to the accompanying drawings, forming a part of this specification.

My invention relates to apparatus for governing the flow of material or liquid, and finds a very useful embodiment in water softening apparatus and the invention will be specifically described as embodied in a water softening apparatus, though it is not to be limited thereto.

My invention will be further pointed out in the appended claims and will be fully described by reference to the accompanying drawing, showing the preferred embodiment thereof, in which—

Figure 1 is a view somewhat diagrammatic in its nature, illustrating the preferred embodiment of the invention in elevation, partially in section. Fig. 2 is a plan view of a portion of the apparatus shown in Fig. 1 on line 2 2 of Fig. 1.

Like parts are indicated by similar characters of reference in both figures.

The settling tank, which is well-known in the art, is indicated at 1. Above it, there is illustrated a constant level chamber 2 that first receives the water to be treated and from which the water is discharged into the settling tank by agency of the mechanism to be described. The constant level chamber receives water from the supply pipe 3 connected to any suitable source of supply, there being a valve 4 of well-known construction included within this pipe and governed in its action by a float 5 connected therewith, the float sinking whenever the level of the water in the chamber 2 recedes from its predetermined location to effect an operation of the valve 4 to permit the supply of enough water to the chamber 2 to restore the level.

The tanks 1 and 2 are in communication by any suitable arrangement, there being indicated in the embodiment of the invention shown a pipe 6 leading from the bottom of the tank or chamber 2 into the settling tank. The upper end of the pipe 6 is closed by any suitable form of valve 7. In the embodiment of the invention shown, this valve is in the form of a flat valve pivoted at one end to a mounting 8 supported within the chamber or tank 2 and attached at its free end to a chain or cable 9 passing over a pulley 10 mounted upon the upper end of a bracket 11 secured to the tank 2. The end of the chain or cable 9 opposite to that attached to the valve 7 is secured to a lever arm 13. The lever arm 13 is fulcrumed at 14 upon a support that is secured to the tank or chamber 2. A link 15 is connected with the arm 13 at the upper end of said link, the lower end of the link being connected with a bucket 16 that is adapted for vertical movement under conditions hereinafter to be specified, this bucket effecting a control of the position of the arm 13, and thereby the position of the valve 7 to open and close the pipe 6, thereby to permit or prevent the passage of water to be treated to the tank 1 from the tank 2. The element 16 also controls the admission of chemical to the settling tank, preferably by means of the mechanism now to be described. A chain or cable connection 17 exists directly between the lever 13 and a swinging chemical discharge spout 18, which, when in its lowermost position, as indicated, permits the passage of chemical from a suitable chemical supply to the settling tank 1, a funneled pipe 19 being shown interposed between the chemical discharge spout 18 and the settling tank. When said discharge spout is in its upper position, the passage of chemical through it is impossible.

In the embodiment of the invention shown, I have illustrated a jacket 20 about the upper end of a chamber 21, a supply pipe 22 leading to the chamber 21, while an eduction pipe 23 leads from the jacket 20, this latter pipe removing the chemical which overflows from the chamber 21 into the surrounding chamber 20. A pump 24 forces the chemical from a suitable chemical reservoir 25, this pump effecting a constant head of chemical within the chamber 21, as will be understood and all as fully described in my aforesaid copending application.

The settling tank 1 may be considered as having an upper limiting level 26 and a lower limiting level 27. Fresh water and chemical is to be admitted to the settling tank when the water within the settling tank reaches the lower limiting level 27, and the flow of water and chemical to the tank is to be cut off when the water within said tank reaches the upper limiting level 26. For this purpose, the bucket 16 is brought into communication with the settling tank 1, so as to receive sufficient water from the settling tank, when the water within the settling tank has reached its upper limiting level, whereby, owing to the weight of the water then received within the bucket, said bucket is caused to descend, thereby to rock the lever 13 in a clockwise direction to cause an elevation of the spout 18 and a depression of the valve 7, so that no more water and chemical will thereafter be received in the tank 1 as long as the level within said tank is above the lower limiting level 27. When the fluid within the tank 1 reaches the lower limiting lever 27, the bucket 16 then has a lesser quantity of water within it, said bucket then rising, owing to the preponderating weight of the lever 13 desirably augmented by an adjustable weight 28, slidably mounted upon the lever 13. When the weight 28 thus operates to raise the bucket, the quantity of liquid within the bucket decreases as the bucket rises, said weight thus being permitted firmly to insure the opening of the valve 7 and the depression of the spout 18, to restore the full quantity of liquid and chemical to the tank 1. In order that the bucket 16 may be controlled in its vertical movement by the fluid within the tank 1, I place said bucket in substantially constant communication with the interior of the tank 1, so that water may flow from said tank into said bucket, but, in order to permit the water when received in sufficient quantity within the bucket 16, to cause the descent of said bucket, I prevent the exterior of the bucket from coming into contact with the fluid in the tank 1. This latter characteristic of my apparatus may be realized in a variety of ways.

I have shown in the embodiment of the invention herein illustrated, a chamber 29 setting within the tank 1, but itself out of communication with said tank so as to have its interior free of fluid. In order that the bucket 16 may be thrown into communication with the tank 1, so as to receive fluid therefrom, I provide some suitable form of piping 30, which at one end projects through a wall 31 separating the bucket from the tank and projecting at its other end into the interior of the bucket 16. In this way fluid may be conducted from the tank 1 into the bucket 16 or discharged from the bucket 16 into the tank 1, without finding access to the space between said bucket and tank. I do not wish to be limited to the form of piping illustrated. It will be apparent that the bucket 16 has two alternative positions and occupies, in the embodiment of the invention shown, no position between these alternative positions except in transit between said positions.

The portion of the piping 30 projecting through the bucket 16 is located near the bottom of the bucket, so that the level of the liquid within the bucket 16 is coincident with the level of the liquid in the tank 1. It is, however, apparent that the level of the liquid within the bucket varies with respect to the bottom of the bucket. In the position of the parts shown, the bucket 16 has been raised by the weight 28, whereby the valve 7 is opened and the spout 18 is lowered. This condition initially occurs when the level of the liquid in the tank 1 reaches the line 27. As the level in the tank 1 and in the bucket 16 rises toward the upper limiting level 26, the quantity of liquid within the bucket 16 increases, this liquid flowing through the pipe 30 into the bucket. When the level reaches the line 26, sufficient liquid has been received within the bucket 16 to counteract the weight of the lever 13 and its rider 28, whereupon the bucket 16 sinks, the arm 13 is moved in a clockwise direction, the valve 7 is closed and the spout 18 is raised, so that no more material is received into the tank 1. Water undergoing treatment is withdrawn from the tank 1 to be used for the purpose for which it is treated; the level of the liquid within said tank lowers, and, consequently, the level of the liquid within the bucket 16 lowers, it flowing from the bucket into the tank through the piping 30, the quantity of liquid within the bucket 16 lessening, owing to the fact that the bucket 16 does not lower during the descent of the level of the liquid within the bucket. When the level of the liquid within the bucket 16 has lowered sufficiently, that is, when it reaches the line 27, a minimum quantity of liquid is then contained in the bucket 16, the amount of liquid within the bucket being then reduced sufficiently to permit the weight 28 to counteract the effect of the weight of the bucket 16 and the minimum quantity of water it contains, whereby the valve 7 is again raised and the spout 18 is again lowered to permit of the entry of fresh liquid and chemical within the tank 1 until the upper limiting level 26 is again reached.

It will be seen that I have provided a vertically moving bucket with a connection between it and the settling tank, whereby enough liquid is received within the bucket when the upper limiting level has been reached in the tank, to cause the descent of the bucket against the action of the weight 28, thereby to close the valve 7 and raise the spout 18 to cut off further supply of water and chemical to the settling tank, and whereby when the liquid within the settling tank has reached its lower limiting level, the quantity of water within the bucket 16 is sufficiently reduced to permit the weight 28 to operate upon the lever 13 and cause an opening of the valve 7 and the lowering of the spout 18. In the prefered embodiment of the invention, the level of the liquid within the bucket 16 is always coincident with the level of the liquid within the settling tank 1, this being permitted by the flow of liquid from the tank into the bucket and from the bucket into the tank. I do not wish to be limited, however, to this characteristic.

I have herein shown my invention as embodied in water softening apparatus, but I do not wish to be limited to this application of the invention, as I desire to have the invention protected irrespective of the use to which it is put.

While I have herein shown and particularly described the preferred embodiment of my invention, I do not in my claims limit myself to the precise construction shown.

I claim:

1. An apparatus of the class described including a tank, a source of liquid supply therefor, a bucket adapted to receive liquid discharged from said source, fluid conducting means for communication with the fluid in said bucket for permitting the flow of fluid from the bucket to lighten the bucket, and mechanism preventing and permitting the flow of fluid from said source to said tank independently of the bucket and governed by said bucket.

2. An apparatus of the class described including a tank, a source of liquid supply therefor, a bucket, fluid-conducting means for communication with the fluid in said bucket for permitting the flow of liquid from said bucket to lighten the bucket and also serving to permit the flow of fluid from said tank into said bucket to make the bucket heavier, and mechanism preventing and permitting the flow of fluid from said source to said tank and governed by said bucket.

3. An apparatus of the class described including a tank, a source of liquid supply therefor, a source of material supply, a bucket adapted to receive liquid discharged from said liquid source, fluid-conducting means for communication with the fluid in said bucket for permitting the flow of fluid from the bucket to lighten the bucket, and mechanism preventing and permitting the flow of material from said material source to said tank independently of the bucket and governed by said bucket.

4. An apparatus of the class described including a tank, a source of liquid supply therefor, a source of material supply, a bucket, fluid-conducting means for communication with the fluid in said bucket for permitting the flow of liquid from said bucket to lighten the bucket and also serving to permit the flow of fluid from said tank into said bucket to make the bucket heavier, and mechanism controlling the flow of material from said material source to said tank and governed by said bucket.

5. An apparatus of the class described including a tank, a source of liquid supply therefor, mechanism for preventing and permitting the flow of liquid from said source to said tank, a bucket controlling said mechanism, and piping for conveying water from said tank to said bucket, said piping also affording passage for liquid from said bucket back to the tank, whereby the bucket may be lightened.

6. An apparatus of the class described including a tank, a source of liquid supply therefor, a source of material supply, mechanism for preventing and permitting the flow of material from said material source to said tank, a bucket controlling said mechanism, and piping for conveying water from said tank to said bucket, said piping also affording passage for liquid from said bucket back to the tank, whereby the bucket may be lightened.

7. An apparatus of the class described including a tank, a source of liquid supply therefor, a bucket adapted to receive liquid discharged from said source, fluid conducting means for communication with the fluid in said bucket for permitting the flow of fluid from the bucket to lighten the bucket, and mechanism preventing and permitting the flow of fluid from said source to said tank and governed by said bucket, the bucket being adapted to be placed in alternative operative conditions upon the liquid reaching alternative levels, thereby to permit the full flow or cut off the flow of liquid.

8. An apparatus of the class described including a tank, a source of liquid supply therefor, a bucket, fluid-conducting means for communication with the fluid in said bucket for permitting the flow of liquid from said bucket to lighten the bucket and also serving to permit the flow of fluid from said tank into said bucket to make the bucket heavier, and mechanism preventing and permitting the flow of fluid from said source to said tank and governed by said bucket, the bucket being adapted to be placed in alternative operative conditions upon the liquid reaching alternative levels in said tank, thereby to permit the full flow or cut off the flow of liquid.

9. An apparatus of the class described including a tank, a source of liquid supply therefor, mechanism for preventing and permitting the flow of liquid from said source to said tank, a bucket controlling said mechanism, and piping for conveying water from said tank to said bucket, said piping also affording passage for liquid from said bucket back to the tank, whereby the bucket may be lightened, the bucket being adapted to be placed in alternative operative conditions upon the liquid reaching alternative levels in said tank, thereby to permit the full flow or cut off the flow of liquid.

In witness whereof, I hereunto subscribe my name this 21st day of December A. D., 1907.

KENT W. BARTLETT.

Witnesses:
S. LOEHRER,
H. A. HIBBARD.

Copies of this patent may be obtained for five cents each, by addressing the "Commissioner of Patents, Washington, D. C."